June 25, 1957  F. VEATCH ET AL  2,797,201
PROCESS OF PRODUCING HOLLOW PARTICLES AND RESULTING PRODUCT
Filed Oct. 2, 1953  2 Sheets-Sheet 1

INVENTORS
FRANKLIN VEATCH
RALPH W. BURHANS
BY *Leland L. Chapman*
ATTORNEY

# United States Patent Office 2,797,201
Patented June 25, 1957

2,797,201

PROCESS OF PRODUCING HOLLOW PARTICLES AND RESULTING PRODUCT

Franklin Veatch, Lyndhurst, and Ralph W. Burhans, Cleveland, Ohio, assignors to The Standard Oil Company, Cleveland, Ohio, a corporation of Ohio Application October 2, 1953, Serial No. 383,908

Claims priority, application Great Britain May 11, 1953

28 Claims. (Cl. 260—2.5)

The present invention relates to a process of forming hollow particles from film-forming material, and to the particles which are produced by this process.

Particles formed of a variety of materials have heretofore been prepared for a number of uses. However, it has been found quite difficult to prepare hollow particles which are completely free from holes. In consequence, such particles, when placed on the surface of a liquid of low viscosity and surface tension, quickly fill with liquid and sink to the bottom.

It is an object of the present invention to produce hollow particles, which are separate unitary and discrete entities, which have a thin strong skin, which are substantially spherical in shape, which are formed from film-forming material and are substantially free from holes.

It is a further object to produce a hollow particle having a gas sealed therewithin in sufficient amount to exert a pressure great enough to resist shrinkage of the particle walls while they are still plastic under the pressure of the atmosphere.

These objects are accomplished by incorporating a latent gas in the solution of film-forming material employed to form the particles.

Figure 1:
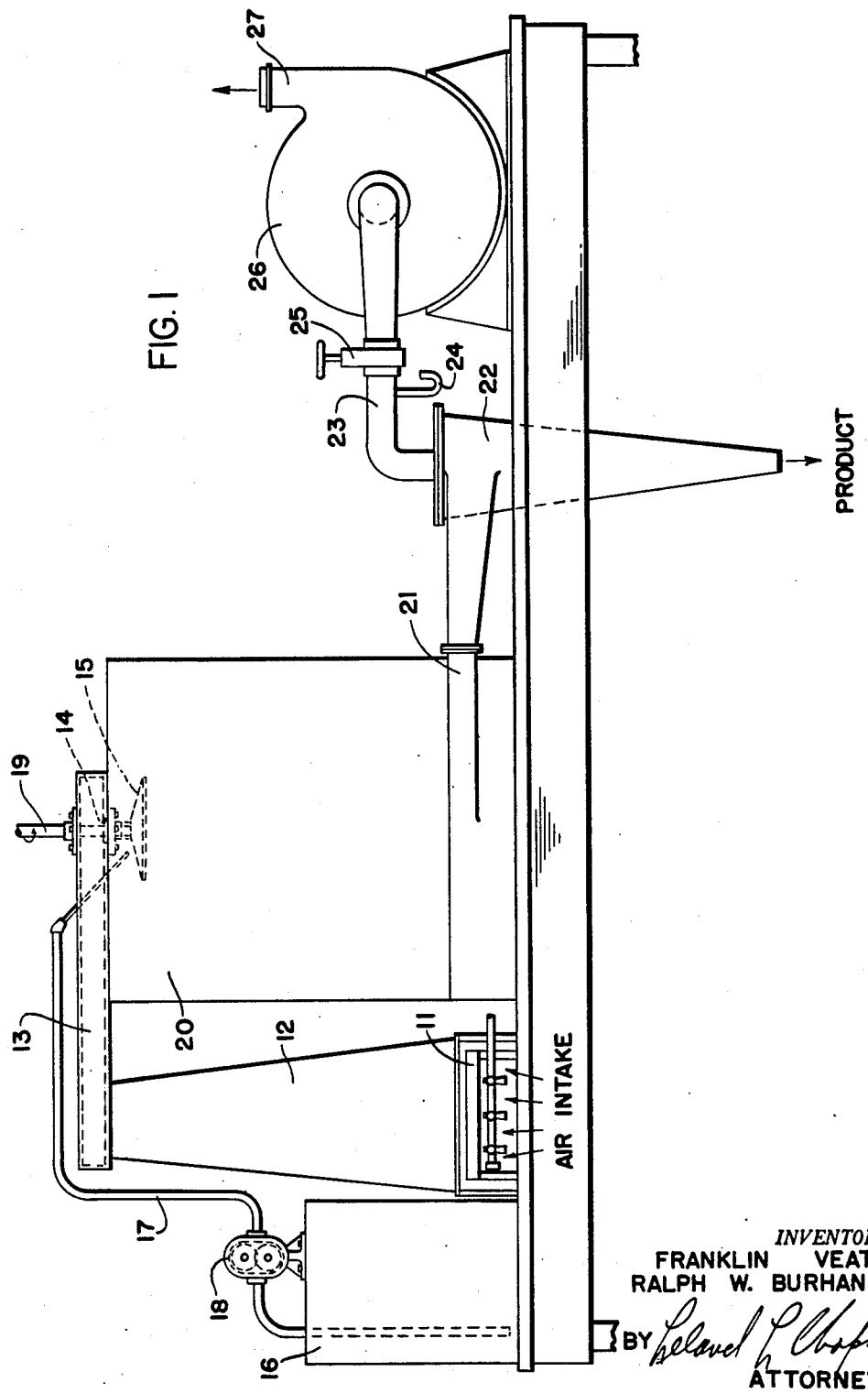
Figure 2:
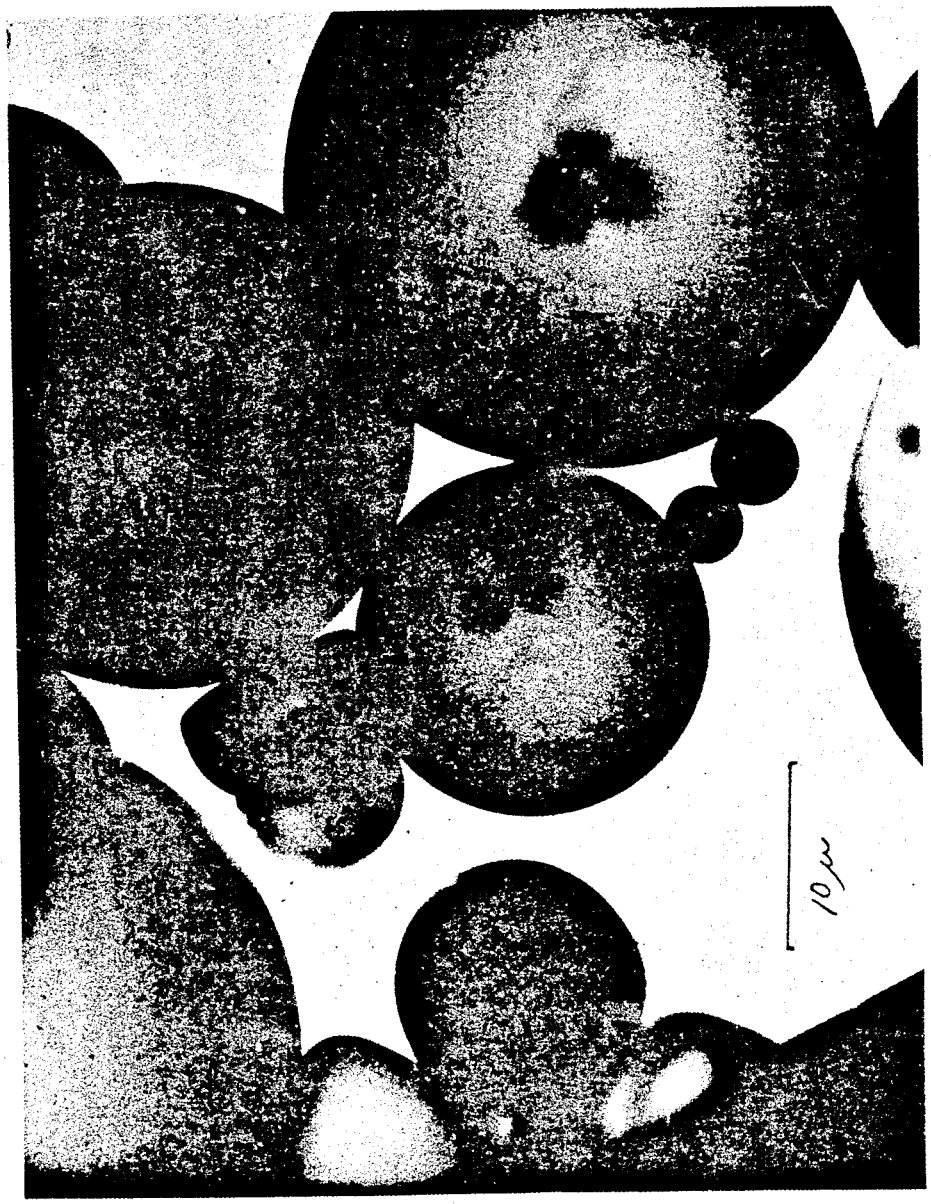

The invention will be understood by reference to the following description and the accompanying drawings in which Figure 1 is a sketch of a conventional spray-dry apparatus useful in carrying out the process of the invention; and Figure 2 is a view of the hollow particles produced by the claimed process, enlarged to the scale indicated in the figure.

In accordance with the invention, a solution comprising a volatile solvent having dissolved therein film-forming material and a latent gas is subdivided into droplets and the droplets are then subjected to a drying temperature at which the solvent is volatilized and a hole-free tough surface skin is formed on the particles, and at which the latent gas is converted into a gas. In this way gas is liberated within the particle coincident with its formation and is trapped beneath the surface skin of the particle, and either forms a hollow space therewithin or finds its way into a hollow space otherwise formed therein, and through its presence there tends to prevent collapse of the particle walls under pressure of the atmosphere. The particles should be as hole-free as possible to achieve under manufacturing conditions. The perfection to be achieved will depend on the use. They should at all events be sufficiently hole-free to prevent the gas in the particle from being displaced to an appreciable extent by any other medium in which the particles are in contact in use.

The term "latent gas material" is used herein to refer to any material, whether solid, liquid or gaseous, which can be incorporated in the solution of the film-forming material and which can be converted into a gas, i. e., which produces a gas or is rendered gaseous, at an elevated temperature, preferably a temperature at which the film-forming solution may be dried. The agent may itself be a gas, which prior to the conversion is in dissolved form, or it may be a liquid or solid which volatilizes or reacts with another material or substance or decomposes to form a gas at such a temperature.

For example, if water is employed as the solvent, dissolved gases which may be employed include dissolved carbon dioxide, methyl chloride and ammonia, while if an organic solvent is employed, dissolved gases such as methyl chloride, dimethyl ether, ethylene oxide, methyl amine, methyl bromide, and dimethyl amine may be used.

There are a large number of liquid and solid substances which are decomposable at elevated temperatures or react with other materials or substances to produce gases, and are known in the art as blowing agents. These substances are widely used to produce cellular plastics and plastic foams. Any blowing agent may be employed in the process of the instant invention, provided it can be incorporated in the solution of film-forming material.

Satisfactory blowing agents include inorganic and organic salts selected from the group consisting of carbonates, nitrites, carbamates, oxalates, formates, benzoates, sulfites and bicarbonates, such as sodium bicarbonate, sodium carbonate, ammonium carbonate, sodium nitrite, ammonium chloride, ammonium carbamate, ammonium bicarbonate, sodium sulfite, calcium oxalate, magnesium oxalate, sodium formate, ammonium benzoate, ammonium nitrite and mixtures forming the same, and organic substances such as p-hydroxy phenylazide, di-N-nitrosopiperazines, polymethylene nitrosamines, such as di-N-nitrosopentamethylene tetramine (available commercially under the trade name "Unicel N. D." as a mixture of 40% dinitrosopentamethylene tetramine and 60% filler) and trimethylenetrinitrosamine and compounds containing two or more groups of the formula CON (alkyl) NO, such as succin-bis (N-nitrosomethylamide), diazoaminobenzene (Porofor DB), diazoiso-butyric acid dinitrile (Porofor N), and homologues thereof prepared using cyclohexanone (Porofor 254) or methyl ethyl ketone instead of acetone.

Many blowing agents will react with other substances, to produce gases. Carbonates and sulfites, for example, such as sodium carbonate and sodium sulfite, react with acids such as hydrochloric or sulfuric to produce carbon dioxide and sulfur dioxide, respectively. Ammonium salts react with bases such as sodium hydroxide to liberate ammonia. Therefore, by feeding in hydrochloric acid solution to a solution of a film-forming material in accordance with the invention containing a carbonate or sulfite just as the solution is entering the atomizer, carbon dioxide or sulfur dioxide is liberated and is present during spray-drying as the gas necessary for forming hole-free hollow particles.

Since the amount of gas or gas-producing substance, collectively termed "latent gas material" herein, that is required will depend upon the concentration of the solution, the amount of gas formed per unit weight of the latent gas material, the size of particle and other factors that will be apparent hereinafter, specific quantities and ranges cannot be given. The art will understand from the information contained herein, and particularly from that given in the examples, what proportions to employ in the ordinary case. In general, however, it may be said that an amount in the range of from 0.1% to about 25% by weight of the solution is usually sufficient.

The invention is applicable to the formation of hollow particles from any natural or synthetic film-forming material which is soluble in an acidic, alkaline or neutral aqueous solution, or in an organic solvent, and which can form a solution whose viscosity is sufficiently low to permit subdivision of the solution into small droplets, and which is capable of gelling on evaporation of a solution thereof to form a relatively tough gas-impermeable skin or film.

The term "film-forming material" is used herein to refer to film-forming materials as a class. The organic materials include cellulose derivatives, such as cellulose acetate, cellulose acetate-butyrate, and cellulose acetate-propionate, thermoplastic synthetic resins, such as polyvinyl resins, i. e., polyvinyl alcohol (water- or organic solvent-soluble), polyvinyl chloride, copolymers of vinyl chloride and vinyl acetate, polyvinyl butyral, polystyrene, polyvinylidene chloride, acrylic resins such as polymethyl methacrylate, polyallyl, polyethylene, and polyamide (nylon) resins, and thermo-setting resins in the thermoplastic water- or organic solvent-soluble stage of partial polymerization, the resins being converted after or during formation of the particles into a more or less fully polymerized solvent-insoluble stage, such as alkyd, polysiloxane, phenol-formaldehyde, urea-formaldehyde and melamine-formaldehyde resins. All of these resins are film-forming and therefore capable of forming tough-skinned particles during evaporation of droplets of solutions thereof in aqueous or organic solvents. Natural film-forming materials are also included within the scope of the form, including soybean protein, zein protein, alginates, and cellulose in solution as cellulose xanthate or cuprammonium cellulose. Inorganic film-forming substances such as the sodium silicates, polyborates and polyphosphates are also contemplated as within the scope of the above term.

The solvent employed will, of course, be dictated by the solubility of the film-forming material used. The solvent should, upon evaporation, be conducive to gelation of the material, so that a tough skin is quickly formed over the surface of the droplet. Water, alcohols, ethers, esters, organic acids, hydrocarbons and chlorinated hydrocarbons, are the most noteworthy satisfactory solvents. The following table lists certain solvents suggested for various materials, but obviously the list is not all-inclusive either of solvents or of film-forming materials and many other combinations will be obvious to those skilled in the art:

aqueous solution at 20° C. is 4 to 28 cp. by the Hoeppler falling-ball method) or from 1% to 30%, preferably 5% to 20%, phenol-formaldehyde resin, are very satisfactory.

The solution is prepared, subdivided into droplets, and dried, by conventional means. The use of spray drying equipment, in which the droplets are dried in a current of hot gas, usually air, is especially advantageous. A typical spray-dry apparatus is shown in Figure 1. In the operation of this apparatus according to the process of the invention, air is heated by passing upwardly past a gas burner 11 and into the air intake 12. It then passes through conduit 13, through a spray-dry chamber opening 14, and over the atomizing disc 15. The solution to be spray-dried is pumped from the reservoir 16 via line 17 by means of pump 18 whereupon it is discharged at a point near the center of the disc 15. The disc 15 is attached to the end of the shaft 19 which is rotated at high speeds and the solution is thereby sub-divided into small droplets. The mixture of hot drying air and droplets passes downward through the spray-dry chamber 20 whereby the hollow particles are formed in the manner explained and out via line 21. Inlet and outlet temperatures are measured in lines 13 and 21, respectively. The spray-dried particles are separated from the air in the cyclone separator 22 and are removed at the bottom thereof. The remaining air is drawn through a conduit 23 past the monometer 24 and gate valve 25 by means of the exhaust fan 26. The air is finally discharged to the atmosphere via the exhaust line 27.

The drying temperature is adjusted according to the stability and softening point of the film-forming material, the size of the droplets produced and the volatility of the solvent employed. However, as those skilled in the art appreciate, because of the cooling effect of evaporation, drying air of very high temperatures may be used without injury to low melting or easily decomposable materials. A high drying rate is very desirable; usually, air temperatures in the range of 80 to 700° F. will be adequate. Satisfactory drying conditions for individual cases are shown in the examples.

SYNTHETIC PLASTICS [1]

|  | UF and PF | CA | CAB | PVA | PVAc | PS | PE | PM | PAm | PVCl | PVB |
|---|---|---|---|---|---|---|---|---|---|---|---|
| Water | x |  |  | x |  |  |  |  |  |  |  |
| Ethyl acetate |  | x | x |  | x | x |  |  |  | x | x |
| Methyl Cellosolve |  | x | x |  |  |  |  |  |  |  | x |
| Acetone |  | x | x |  | x |  |  | x |  |  | x |
| Trichloroethylene |  | x | x |  | x | x | x | x |  | x | x |
| Monochlorobenzene |  |  |  |  | x | x | x | x |  | x | x |
| Chloroform |  | x | x |  |  | x | x |  |  |  | x |
| Carbon tetrachloride |  |  |  |  | x | x | x |  |  | x | x |
| Xylene |  |  |  |  | x | x | x | x | x | x | x |
| Methyl alcohol |  |  |  | x |  |  |  |  |  |  | x |

[1] CA—cellulose acetate; CAB—cellulose acetate butyrate; PVAc—polyvinyl acetate; PS—polystyrene; PE—polyethylene; PVA—polyvinyl alcohol; PM—polymethyl methacrylate; PAm—polyamide; PVCl—polyvinyl chloride; PVB—polyvinyl butyral; PF—phenol-formaldehyde; UF—urea-formaldehyde.

The concentration of the solution of film-forming material is not critical. The lower limit is governed by the size of the particle, for the smallest particles are formed from dilute solutions. More concentrated solutions yield particles having a greater skin thickness and higher density. The upper limit is set by the viscosity of solutions of the material and by particle size. The solution may be colloidal or contain some undissolved material.

It is desirable that the droplets not be so large that shrinkage is great in proportion to the size of the droplet. Shrinkage is also determined in part by the concentration of the solution. It has been found that good results may be obtained with solutions which contain as much as 50% film-forming material, and that optimum results are obtainable with solutions containing from 1% to 25% film-forming material. Solutions as dilute as 0.1% have given satisfactory results. Aqueous solutions which contain from 1% to 10% polyvinyl alcohol (viscosity of a 4%

The dry particles in accordance with the invention that are produced in conventional spray drying equipment, employing solutions of the concentrations indicated above, may vary in size. They are ordinarily spherical in shape as shown in Figure 1, and when they are of a size smaller than can be seen with the naked eye they are characterized by the trademark "Microballoons." The optimum size will depend somewhat on their use. For many purposes they may have an average diameter of 1 to about 500 microns preferably 25 to 250 microns. Larger sizes up to about one-eighth of an inch diameter are suitable for some purposes although large particle size may not be as important as low density. Frequently their diameter is about 5 to 20 times the thickness of the plastic skin surrounding their hollow interior, but these dimensions will depend upon the droplet size produced by the equipment used and the concentration of the film-forming material and the latent gas material in the solution.

The bulk density is within the range 0.01 to 0.3, preferably 0.1 to 0.2, and the liquid displacement density is within the range of 0.05 to 0.6 (gm./cc.), preferably 0.2 to 0.5. The bulk density is of interest in transporting or storing the dry particles. The liquid displacement density is of interest when the space between the particles is to be another material.

The action of the latent gas material in the process of the invention has not been absolutely established by experimental evidence. The following theory has been proposed as a possible explanation in the light of the evidence available, but the invention is not to be limited thereby.

When a solution of film-forming material which does not contain a latent gas is spray dried, hollow particles may be formed, but such particles almost invariably contain holes. It is thought, by way of explanation, that as the solvent evaporates from the droplets, surface shrinkage and surface thickening occurs in the droplet, and these changes continue until the droplet has decreased considerably in diameter and a thick skin, which has sufficient mechanical strength to resist further shrinkage, is formed around the remaining liquid. Thereafter, solvent is lost by diffusion through the skin and a particle is formed having a hollow interior filled with solvent vapor. After the particle is cooled upon emerging from the drying chamber, the solvent vapor within condenses and the pressure within the particle is reduced to the vapor pressure of the solvent at room temperature. The pressure of the atmosphere outside the particle may then become sufficiently great, in relation to the pressure within the particle, to wholly or partially collapse the particle, or push in through weak spots in the skin, producing holes.

When a latent gas material is present, it is thought that the droplets of solution, as solvent evaporates, shrink with formation of a surface skin, as before. Thereafter, latent gas which is converted into gas within the skin is trapped within the droplet. Although solvent possibly may diffuse out through the skin, this gas is confined in the space therewithin. This gas, if it exerts a sufficient pressure, assists the particle walls in resisting the pressure of the atmosphere, so that collapse of the walls or formation of holes therein cannot occur. Also, since the gas pressure within the particle during drying exerts a force on the walls while they are still plastic, the droplet does not shrink nearly as much as when the gas is absent. In fact, if sufficient gas is present it should be possible to form particles of larger diameter than the droplet, the particle walls being expanded while still plastic during formation of gas therewithin. This theory explains why the material employed must be film-forming since, unless a tough, relatively gas-impermeable skin is formed on the surface of the droplet during drying, gas is not retained within the particle in sufficient quantity to develop the necessary pressure.

The following examples illustrate the invention. Sufficient ammonium hydroxide was added to each solution to make it slightly alkaline, in order to prevent decomposition of the latent gas.

Examples 1 to 4

Four aqueous solutions of a water-soluble partially polymerized phenol-formaldehyde resin (Durez 14798) were prepared. One of these solutions did not contain any latent gas material, while the others contained, as latent gases, 1% ammonium carbonate, ammonium nitrite, and dinitrosopentamethylenetetramine, respectively.

The solutions were spray dried under the conditions set forth in the table below and the hollow particles obtained were tested in order to determine the number of hole-free particles produced. In this test, hereinafter called the "flotation test," a weighed quantity of the spray-dried particles is floated in a bath of petroleum naphtha (initial point 210° F., E. P. 310° F.) at room temperature (25° C.) and the percentage of the original sample which sinks after 24 hours is determined. In order to pass this test, at least 95% of the sample must float.

As a further check, the gas displacement method for determining particle density was also used. In this test particles with holes displace a smaller volume of air and liquid than hole-free particles. The size of the particles was determined, and from this the droplet size (mu) $D_2$ was calculated, using the following formula:

$$D_2 = D_1 \sqrt[3]{\frac{d}{pd_s}}$$

where $D_2$ = diameter of droplet
$D_1$ = diameter of particle
$d$ = density of particle
$d_s$ = density of solution
$p$ = wt. fraction of plastic material in solution The shrinkage factor $(D_2/D_1)^3$ is the ratio of the volume of the droplet to the volume of the particle. A low shrinkage factor indicates influence of gas in the interior of the particle in preventing normal shrinkage during solvent evaporation.

The results were as follows:

|  | 1 | 2 | 3 | 4 |
|---|---|---|---|---|
| Feed Stock Composition: |  |  |  |  |
|   Solid | Durez 14798 | Durez 14798 | Durez 14798 | Durez 14798. |
|     Wt. percent | 10 | 10 | 10 | 10. |
|   Solvent | Water | Water | Water | Water. |
|     Wt. percent | 90 | 89 | 89 | 89. |
|   Latent gas |  | DNPT [1] | $(NH_4)_2CO_3$ | $NH_4NO_2$. |
|     Wt. percent |  | 1.0 | 1.0 | 1.0. |
| Operating Conditions: |  |  |  |  |
|   Air Temp. °F.: |  |  |  |  |
|     Inlet | 700 | 700 | 700 | 700. |
|     Outlet | 400 | 400 | 400 | 400. |
|   Feed rate, cc./minute | 95 | 105 | 111 | 111. |
|   Calcd. recovery, wt. percent | 90 | 100 | 91 | 87. |
| Product Properties: |  |  |  |  |
|   Density, gms./cc.: |  |  |  |  |
|     Dry Bulk | 0.412 | 0.073 | 0.163 | 0.091. |
|     Liquid Displacement | 0.944 | 0.346 | 0.449 | 0.353. |
|     Gas Displacement | 1.10 | 0.551 | 0.879 | 0.497. |
|   Size (microns): |  |  |  |  |
|     Average "Subsieve Sizer" $D_1$ | 14.4 | 14.6 | 22.4 | 17.6. |
|     Range, microscopic | 2–20 | 2–30 | 2–30 | 2–40. |
|   Calculations: |  |  |  |  |
|     Droplet size (mu) $D_2$ | 30 | 22 | 37 | 27. |
|     Shrinkage factor $(D_2/D_1)^3$ | 9.5 | 3.5 | 4.5 | 3.5. |
|   Flotation Test, percent Sunk after 24 hours | 100 | 2.0 | 3.0 | 1.0. |

[1] DNPT is dinitrosopentamethylenetetramine obtained from commercial Unicel N. D.

The data on particle size and liquid and gas displacement show that even though the particles prepared by spray drying in the presence of the latent gas are larger, their liquid and gas displacement densities are lower. This indicates that liquids and gases are unable to penetrate into the interior hollow space of the particles. In other words, the particles are free from holes. This is confirmed by the flotation test, in which less than 3% of the particles prepared from a latent gas-containing solution sank after 24 hours, compared to 100% when there is no latent gas material present. The fact that the gas at the interior of the particles prevents shrinkage and collapse of the walls is shown by the shrinkage factor, which is approximately ⅓ that when the latent gas is absent.

It is also noteworthy that as little as 1% latent gas by weight of the solution is sufficient to prevent formation of holes and collapse of the walls of the particles.

*Examples 5 to 7*

Aqueous polyvinyl alcohol solutions were prepared, two of which solutions contained ammonium carbonate and one of which contained ammonium nitrite. The solutions were spray dried under the conditions set forth in the table, and the recovered particles were subjected to the flotation test, with the results listed:

table below, and the particles thereby produced tested as described above with the following results:

|  | 8 | 9 |
|---|---|---|
| Feed Stock: |  |  |
| Plastic material | Durez 15281.[1] | Bakelite BR 18372.[1] |
| Wt. percent | 10.0 | 10.0. |
| Solvent | H₂O | water. |
| Wt. percent | 89.0 | 89.0. |
| Latent gas | DNPT | DNPT. |
| Wt. percent | 1.0 active | 1.0 active. |
| Decomp. temp. of latent gas, °C | above 100 | above 100. |
| Operating Conditions: |  |  |
| Air Temp. °F.: |  |  |
| Inlet | 700 | 700. |
| Outlet | 400 | 450. |
| Feed rate, cc./min | 45 | 66. |
| Calcd. recovery, wt. percent |  |  |
| Product Properties: |  |  |
| Density (g/cc.): |  |  |
| Dry bulk | 0.048 | 0.047. |
| Liquid displacement | 0.280 | 0.211. |
| Gas displacement | 0.681 | 0.362. |
| Size (microns): |  |  |
| Average "Subsieve Sizer" $D_1$ | 18.6 | 24.6. |
| Range (microscopic) | 2–40 | 5–60. |
| Calculations: |  |  |
| Droplet size (mu) $D_2$ |  | 32. |
| Shrinkage factor $(D_2/D_1)^3$ |  | 2.1. |
| Flotation Test, percent sunk 24 hours | 3.0 | 1.0. |

[1] Water-soluble partially polymerized phenol-formaldehyde resin.

|  | 5 | 6 | 7 |
|---|---|---|---|
| Feed Stock: |  |  |  |
| Plastic material | PVA | PVA | PVA. |
| Wt. percent | 4.9 | 5 | 5. |
| Solvent | H₂O | H₂O | H₂O. |
| Wt. percent | 95 | 94.5 | 94. |
| Latent gas | (NH₄)₂CO₃ | (NH₄)₂CO₃ | NH₄NO₂. |
| Wt. percent | 0.1 | 0.5 | 1.0. |
| Decomposition temp., °C | 58 | 58 | 80. |
| Operating Conditions: |  |  |  |
| Air Tem. °F.: |  |  |  |
| Inlet | 500 | 600 | 600. |
| Outlet | 230 | 270 | 330. |
| Feed rate, cc./min | 95 | 80 | 91. |
| Calcd. recovery, wt. percent |  | 81 | 73. |
| Product Properties: |  |  |  |
| Density (g./cc.): |  |  |  |
| Dry bulk | 0.058 | 0.068 | 0.16. |
| Liquid displacement | 0.17 | 0.192 | 0.39. |
| Gas displacement | 0.29 | 0.46 | 0.51. |
| Size (Microns): |  |  |  |
| Average "Subsieve Sizer" $D_1$ | 17.5 | 23 | 15.5. |
| Range (microscopic) | 5–50 | 5–50 | 3–30. |
| Calculations: |  |  |  |
| Droplet size (mu) $D_2$ | 27.0 | 36.0 | 30.9. |
| Shrinkage factor $(D_2/D_1)^3$ | 3.7 | 3.8 | 7.9. |
| Flotation Test, percent sunk 24 hours | Trace | 2 | 1. |

PVA=polyvinyl alcohol resin, Grade 70–05 Du Pont "Elvanol" brand.

Viscosity (centipoises) 4–6 in 4 percent solution in water at 20° C. by Hoeppler falling ball method.

*Examples 8 and 9*

Aqueous solutions of water-soluble partially polymerized phenol-formaldehyde resins were prepared containing 2½% (1% active) Unicel N. D. (a commercial blowing agent containing 40% dinitrosopentamethylenetetramine and 60% filler). These solutions were spray dried in standard apparatus under the conditions set forth in the The results of the flotation test show that not over 3% of the particles contained holes, because of the presence of the latent gas material in the solution.

Another run was made with an aqueous solution of a partially polymerized phenol-formaldehyde resin, using p-hydroxy phenylazide as the latent gas material with the following results:

|  | 9a |
|---|---|
| Feed stock: | |
| Resin | Durez 15281.[1] |
| Wt. percent | 8.0. |
| Solvent | Water. |
| Wt. percent | 91.0. |
| Latent gas | p-Hydroxy Phenylazide. |
| Wt. percent | 1.0. |
| Operating conditions: | |
| Air Temp. ° F.— | |
| Inlet | 650. |
| Outlet | 400. |
| Feed Rate, cc./min | 51. |
| Product properties: | |
| Density, gm./cc.: | |
| Dry bulk | 0.03. |
| Liquid displacement | 0.14. |
| Gas displacement | 0.21. |
| Size microns: | |
| Average "Subsieve Sizer" $D_1$ | 31. |
| Range (microscopic) | 2-50. |
| Flotation test: | |
| Percent sunk in 24 hours | 1. |

[1] Water-soluble partially polymerized phenol-formaldehyde resin.

Less than 1% of the particles contained holes, as shown by the results of the flotation test.

*Example 10*

An aqueous 10% solution of sodium silicate was prepared containing 2½% (1% active) Unicel N. D. (40% dinitrosopentamethylenetetramine and 60% filler) and the solution spray dried. The air temperature at the inlet was 700° F. and at the outlet 360° F., and the solution was fed in at a rate of 153.8 cc. per minute. The calculated particle recovery was 80.6%. The product had a dry bulk density of 0.236 gram per cc., a liquid displacement of 0.580 and a gas displacement of 0.693 gram per cc. The average particle size ($D_1$) was 22.2 microns, as determined by a "Subsieve Sizer," and the range of particle size observed in the microscope from 5 to 40 microns. By calculation it was determined from these figures that the droplet size ($D_2$) was 40 microns and the shrinkage factor $(D_2/D_1)^3$ was 5.8.

Two percent of the particles sank when the material was subjected to the flotation test as described heretofore.

*Examples 11 and 12*

This example illustrates the use of a dissolved gas as the gasifying agent.

Aqueous 5% polyvinyl alcohol (viscosity 4 to 6 cp. in 4% aqueous solution at 20° C. by Hoeppler falling-ball method) solutions were prepared and saturated with carbon dioxide and methyl chloride, respectively. The solutions were then spray dried under conditions set forth in the table below, and the particles recovered tested with the following results:

|  | 11 | 12 |
|---|---|---|
| Feed Stock: | | |
| Plastic Material | PVA | PVA. |
| Wt. percent | 5.0 | 5.0. |
| Solvent | $H_2O$ | $H_2O$. |
| Wt. percent | 95.0 | 95.0. |
| Latent gas | $CO_2$ | $CH_3Cl$. |
| Wt. percent | Sat'd (pH 4.5). | Sat'd. |
| Operating Conditions: | | |
| Air Temp. ° F.: | | |
| Inlet | 445 | 440. |
| Outlet | 265 | 260. |
| Feed rate, cc./min | 99 | 102. |
| Calcd. recovery, wt. percent | 74 | 75. |
| Product Properties: | | |
| Density (g./cc.): | | |
| Dry bulk | 0.15 | 0.13. |
| Liquid displacement | 0.57 | 0.64. |
| Gas displacement | 0.61 | 0.61. |
| Size (microns): | | |
| Average "Subsieve Sizer" $D_1$ | 6.8 | 4.8. |
| Range (microscopic) | 5-25 | 10-35. |
| Calculations: | | |
| Droplet size (mu) $D_2$ | 15.3 | 11.3. |
| Shrinkage factor $(D_2/D_1)^3$ | 11.4 | 12.7. |
| Flotation Test, percent sunk 24 hours | 1.0 | 1.5. |

PVA = polyvinyl alcohol.

The results of this test show that dissolved gases are as effective as are substances which decompose to liberate gases. They do not prevent shrinkage as well, but do prevent formation of holes.

The hollow particles above described can be used in a wide variety of low density products. They may, for example, be used per se as a fill type insulation material in which they are not adhered or cohered to each other but confined by a structure on the exterior of a mass of them. They can be used as fillers in place of granulated cork and like materials of cellular structure in manufacturing molded articles, linoleum and floor tile, or as aggregate in concrete and plaster. The particles may also be adhered together, using various techniques or binders, to produce a solid cellular type material of the nature of plastic foam and expanded plastics, for use as thermal, electrical and sound insulation material, plaster board, gaskets, seals, buoys, flotation equipment, aircraft components, boat hulls and decks, shock insulation, ice buckets, toys, decorative items, furniture, and luggage. Sheets of the particles adhered or cohered together are very useful as honeycomb core materials, as for example in sandwich structures formed by bonding the honeycomb core between two relatively thin, dense, high strength faces or skins to form structural, decorative or special purpose panels. The face materials may consist of plywood, metal, plastic laminates, or others.

A very important field of use for the particles of the invention is in insulation. Because of their small diameter and compressibility due to their hollow structure, the particles can readily be poured into a location, packed under pressure and sealed, as in fill-type insulation material.

Layers of a wide variety of the particles, prepared in the manner previously described, were packed in a Fitch apparatus and the thermal conductivity of the layers was determined, with the following results:

| Example No. | Material | Bulk Density, g./cc. | Liquid Displacement Density, g./cc. | Particle size | | B. t. u./hr./ ft.²/°F./in. |
|---|---|---|---|---|---|---|
|  |  |  |  | Average | Range |  |
| A | Polyvinyl Alcohol | 0.012 | 0.057 | 38.6 | 2-110 | 0.32 |
| B | do | 0.068 | 0.192 | 23.0 | 5-50 | 0.31 |
| C | Phenol-formaldehyde | 0.080 | 0.253 | 24.0 | 10-70 | 0.31 |
| D | do | 0.069 | 0.536 | 5.6 | 2-30 | 0.36 |
| E | do | 0.070 | 0.346 | 13.6 | 2.15 | 0.30 |
| F | Protein | 0.063 | 0.80 | 2.0 | 2-30 | 0.32 |
| G | Polystyrene | 0.066 | 0.178 | 35.0 | 2-50 | 0.34 |
| H | Methyl cellulose | 0.055 | 0.147 | 36.5 | 5-100 | 0.32 |
| I | Sodium silicate | 0.236 | 0.552 | 25.0 | 5-100 | 0.45 |
| J | Sodium aluminate | 0.046 | 0.224 | 33.6 | 10-100 | 0.34 |
| K | Wood flour |  |  |  |  | 0.42 |
| L | Granulated cork |  |  |  |  | 0.32 |
| M | Ohio Perlite |  |  |  |  | 0.40 |
| N | Polyvinyl Alcohol powder |  |  |  |  | 0.66 |

The results show the hollow particles in accordance with the invention to be at least as efficient in insulating capacity as granulated cork and more efficient than any of the other materials tested.

Particles of phenol-formaldehyde resin were prepared as set forth in Example 9 having the following properties:

Sample No._____ 9
Loose bulk density:
   gm./cc._____ 0.054
   lbs./ft.³_____ 3.3
Liquid displacement:
   Density g./cc._____ 0.229
Particle size, microns:
   Average_____ 26.4
   Range_____ 2–60

These particles were packed to a density of 3.9 lbs. per cubic foot and their thermal conductivity measured using a standard flat hot plate apparatus for use at any desired temperature. Thermal conductivity at two sets of temperatures was determined, with the following results:

| | | |
|---|---|---|
| Temp. of hot side, °F. | 54.0 | 135.1 |
| Temp. of cold side, °F. | −2.6 | 79.9 |
| Mean Temp., °F. | 25.7 | 107.5 |
| Thermal conductivity | 0.256 | 0.259 |
| Density under test, lbs./ft.³ | 3.9 | |
| Density under test, g./cc. | 0.062 | |

The thermal conductivity represents the amount of heat in B. t. u. per hour which will flow through one square foot area when the temperature gradient is one degree F. per inch thickness.

The above values represent the thermal conductivity of this sample if used as a fill type insulation in a refrigerator or deepfreeze.

The values show that this sample is a very good thermal insulator at ice temperatures as well as higher temperatures, and is as good as or better than other well known commercial insulating materials, such as fiber glass and granulated cork.

Use of heat and/or a solvent, with application of pressure, is a valuable expedient for setting the particles in the form of a shaped mass after they have been packed into a somewhat inaccessible location as in fill-type insulation.

If the hollow particles are formed of a thermoplastic material, such as cellulose acetate, ethyl cellulose, polyvinyl chloride, polyamides, polyethylene and the like, they may be adhered together in any desired arrangement by slightly softening their surfaces at an elevated temperature, with application of moderate pressure insufficient to flatten the particles. The softening temperatures of thermoplastic materials are well known and are set forth in the literature, so that further details on this method are unnecessary for those skilled in the art.

Many materials which can be formed into hollow particles in accordance with the invention are softened or dissolved by water or organic solvents. Application of solvent vapor or liquid in an amount sufficient to soften the surface of the particles and make it sticky without appreciably dissolving the particles can, with moderate pressure, be employed to adhere the particles together. Chlorinated hydrocarbon solvents, such as tetrachloroethylene, can, for example, be used to adhere polyvinyl chloride or polyvinyl acetate particles, acetone to adhere cellulose acetate or ethylcellulose particles, and water to adhere polyvinyl alcohol particles. Those skilled in the art know what solvents may be employed for any given cellulosic and resinous materials.

Reference is made to the "Modern Plastics Encyclopedia," 1950 edition, published by Plastics Catalogue Corporation, and to the "Handbook of Plastics" by Simonds and Lewis, D. Van Nostrand and Company (1943) for data on the softening temperatures of and solvents which may be used with a wide variety of synthetic and natural resinous and cellulosic materials.

Shaped masses of the hollow particles for use as bonded structures, as in insulation and other uses listed above, may also be formed by sintering them together with application of heat and pressure or binding them by action of a solvent and pressure. More commonly, however, a binder is employed, using one of several techniques.

In one procedure the hollow particles are dispersed in a solution of a suitable binder, such as cut-back asphalt, rubber cement or polystyrene dissolved in an organic solvent, or sodium silicate dissolved in water. The solvent is evaporated from the dispersion, depositing the binder upon the particles and adhering them together to produce a solid mass. The following example illustrates one method of application of this procedure.

*Example O*

Hollow particles prepared from a phenol-formaldehyde resin, as set forth in Example 9, were mixed with a commercial rubber cement solution to produce a heavy paste. A second material was prepared by mixing hollow particles from the same batch with another preparation of commercial grade rubber cement which had been cut back by addition of 50% benzene. Each of the pastes was spread in a mold and allowed to dry in air for one day at room temperature. The product was cured in an oven at 85° C. for two days.

The two products were similar in appearance. The surface of each was soft and the material was more resilient than natural cork. The first sample had a density of 0.14 or about 8.7 lbs. per cubic foot, while the sample prepared from the 50% cutback rubber cement had a density of 0.11 or 6.8 lbs. per cubic foot.

A second material was prepared by mixing the phenol-formaldehyde particles with a 40° Bé. aqueous sodium silicate solution and evaporating the water at an elevated temperature. The solid product obtained was very hard and strong, similar to concrete in appearance. Its density was 0.35 or 23 lbs. per cubic foot. Products having a lower density can be prepared by cutting back sodium silicate solution with water.

Also, if desired, the hollow particles may be dispersed in an emulsion of a suitable binder, such as aqueous rubber latex or polyvinyl acetate emulsion. This procedure can be illustrated as follows:

*Example P*

A 60% neutral aqueous rubber latex emulsion was cut back to 30% with water and mixed with phenol-formaldehyde particles prepared as set forth in Example 9 to produce a thick fluid mass. This was poured into a mold connected with a vacuum and the excess binder drawn off. The product was allowed to dry overnight in air at room temperature and then was placed in an oven and cured at 85° C. for two hours.

The finished product was quite resilient, strong and light in weight. The outer surface was tough and smooth. The material had the resiliency of a medium hard rubber. Its density was 0.15 or about 9.4 lbs. per cubic foot, approximating low density natural cork.

In the case of certain binders, such as Vinsol resin or asphalt, which have a relatively low melting point, it is possible to disperse the particles directly in the molten binder.

*Example Q*

Hollow particles of phenol-formaldehyde resin prepared as set forth in Example 9 were mixed with Vinsol resin powder (a thermoplastic resinous material derived from rosin, having a softening point of 106° C. (R. and B.) and available commercially from the Hercules Powder Company) on a 50–50 volume basis. The mix was packed in a mold and placed in an oven, where it was held at 120° C. for four hours. The structure had the strength and texture of sandstone. The density of the product was 0.40 or about 25 lbs. per cubic foot.

A strong rigid structure can be prepared by mixing the hollow particles with a solution of a thermo-setting resin in a solvent-soluble thermoplastic state, evaporating the solvent and then heating the mixture to convert the resin to a fully-hardened solvent-insoluble nonthermoplastic state.

*Example R*

A 50% solution of Bakelite 18372 (a water-soluble partially polymerized phenol-formaldehyde resin) was diluted to a 10% solution with water. Hollow particles of the same resin, and prepared as set forth in Example 9 were blended into the solution to produce a fluid paste. This was poured into a mold fitted with a vacuum attachment and the excess solvent drawn off by application of vacuum. The product was placed in an oven and held at 85° C. for two hours to remove the water and then baked at 120° C. for four hours to complete polymerization of the resin binder.

The product was quite strong and rigid. It had a density of about 0.15 or 9.4 lbs. per cubic foot.

Sheets or shaped objects of the hollow particles may be bound together by binders prepared in situ by chemical reaction. Portland cement and gypsum plaster are examples of the chemical reaction type of binder.

*Example S*

Mixes of one part Portland cement and from 3 to 9 parts of the hollow particles, with the addition of a small proportion of sand in a few cases, were prepared in the form of cylinders 4.4 cm. in diameter and 8.8 cm. in height. The particles used were of phenol-formaldehyde resin, prepared as set forth in Example 9 and of polyvinyl alcohol resin, as set forth in Example 6. The particles had the following properties:

| Material | Phenol-formaldehyde Resin | Polyvinyl Alcohol |
|---|---|---|
| Density, g./cc.: | | |
| Bulk | 0.054 | 0.044 |
| Liquid Displacement | 0.239 | 0.25 |
| Particle size, microns: | | |
| Average | 26.4 | 14.4 |
| Range | 2–60 | 5–70 |

The mixes were poured in plastic molds where they were allowed to remain for 7 days to retain maximum moisture and then allowed to cure in air for 21 days. This 28-day curing time is standard procedure for preparing concrete to be used in compressive strength tests. After removal from the molds the ends of the samples were levelled and sanded. During testing a thin sheet of medium hard rubber was placed at each end of the cylinders to assure a maximum surface contact. The test was performed on a hand operated hydraulic press with a 2000 lb. pressure gauge.

The following results were obtained:

| Hollow Particle | Ratio | Density | | Compressive Strength, p. s. i. | Ratio, Strength/Density |
|---|---|---|---|---|---|
| | | g./cc. | lb./ft.³ | | |
| Phenol-formaldehyde Resin | 1:3 | 0.66 | 41.2 | 500 | 12.2 |
| | 1:4 | 0.58 | 36.0 | 445 | 12.2 |
| | 1:4.5 | 0.56 | 35.0 | 420 | 12.0 |
| | 1:5 | 0.53 | 33.0 | 370 | 11.2 |
| | 1:5 | 0.52 | 32.4 | 370 | 11.4 |
| | 1:6 | 0.49 | 30.6 | 262 | 8.5 |
| | 1:9 | 0.39 | 24.3 | 183 | 7.5 |
| Polyvinyl Alcohol | 1:6 | 0.65 | 41.5 | 430 | 10.4 |
| Phenol-formaldehyde Resin and Sand | 1:3:3 | 1.23 | 77.0 | 400 | 5.2 |
| Perlite | 1:3 | 0.70 | 44.0 | 400 | 9.1 |
| | 1:6 | 0.42 | 26.0 | 183 | 7.0 |
| Vermiculite | 1:3 | 0.80 | 49.8 | 400 | 8.0 |
| | 1:5 | 0.53 | 32.9 | 221 | 6.7 |

These results show that the hollow particles in accordance with the invention are superior to Perlite and Vermiculite as lightweight aggregate in concrete when used in the same proportions. The ratio of compressive strength to density indicates that for a lightweight concrete of given compressive strength a product of lower density and proportionately lower thermal conductivity can be prepared using hollow particles.

The hollow particle concrete structures obtained could be sawed or nailed without cracking, and had a very fine-grained structure comparable in character to air-entrained concrete.

Concrete containing 3 to 6% air is used in many parts of the country to reduce the spalling of concrete roads due to freezing and thawing. However, entrained air coalesces to form large air pockets while the mixture containing suspended air is being transported to location for use. Large air spaces greatly decrease the compressive strength of the concrete and do not appreciably improve the freeze-thaw resistance of the material. The hollow particles of the invention do not coalesce as does entrained air and can be added in the proper concentration and mixed for any length of time during transportation to a location.

*Example T*

Lightweight plaster material was prepared by mixing one part fibrous gypsum plaster with from 2 to 4 parts of phenol-formaldehyde resin particles prepared as set forth in Example 9. These mixes were molded in the form of cylinders 4.4 cm. in diameter and 8.8 cm. in height, being allowed to remain in the molds for 7 days and then allowed to air cure for 21 days. After removal from the molds, the ends of the samples were levelled and sanded and their compressive strength determined in a hand operated hydraulic press with a thin sheet of medium hard rubber at each end of the cylinder to assure maximum surface contact.

The following results were obtained:

| | Ratio | Density | | Compressive Strength, p. s. i. |
|---|---|---|---|---|
| | | g./cc. | lbs./ft.³ | |
| Phenol-formaldehyde Particles | 1:2 | 0.585 | 36.5 | 212 |
| | 1:2 | 0.580 | 36.2 | 208 |
| | 1:3 | 0.473 | 29.5 | 135 |
| | 1:3 | 0.470 | 29.0 | 141 |
| | 1:4 | 0.370 | 23.1 | 106 |
| | 1:4 | 0.362 | 22.6 | 112 |
| Polyvinyl Alcohol Particles | 1:3 | 0.56 | 35 | 192 |
| Perlite | 1:3 | 0.40 | 25 | 159 |
| | 1:3 | 0.427 | 26.6 | 164 |

The results show that the hollow particles of the invention in lightweight plaster have compressive strength values better than Perlite when used in equivalent proportions.

The material was found to be crack and chip resistant, so that it could be sawed or nailed without cracking. Plaster walls made from these particles have excellent insulating and acoustical properties.

*Example U*

Samples of rigid type insulation material were prepared by dispersing hollow particles of phenol-formaldehyde resin in rubber cement and phenol-formaldehyde resin solutions. The particles used were prepared as set forth in Example 9 and had the following properties:

| | | |
|---|---|---|
| Loose Bulk Density: | | |
| gm./cc. | 0.054 | 0.080 |
| lbs./ft.³ | 3.3 | 5.0 |
| Liquid Displacement: Density, g./cc. | 0.229 | .253 |
| Particle Size, Microns: | | |
| Average | 26.4 | 24.0 |
| Range | 2–60 | 10–70 |

The solvents were removed by evaporation. In the case of the phenol-formaldehyde resin solution, the solvent was removed by vacuum filters after which the sample was baked in an oven at 185° F. for one hour and then at 220° F. for three hours to complete polymerization of the phenol-formaldehyde resin. The density and thermal conductivity of the samples were then determined, with the following results:

| Binder | Density, lbs./ft.³ | Average K,[1] B.t.u./hr./ft.²/°F./in. |
|---|---|---|
| Rubber cement | 10.0 | 0.43 |
| Phenol-formaldehyde | 14.0 | 0.29 |
| Do | 8.1 | 0.32 |
| Cork composition | 15.0 | 0.34 |

[1] Determined by Fitch's apparatus.

The samples have a very low thermal conductivity, comparable to granulated cork and hollow particles alone.

The hollow particles may also be employed as a filler in hard-surface floor materials, such as linoleum, asphalt tile, rubber tile and cork tile. A satisfactory linoleum composition may be prepared by blending the particles in a mixture of oxidized linseed oil and wood flour, replacing the powdered cork filler ordinarily used. Asphalt tile is prepared from asbestos fiber and mineral pigment with an asphalt binder. This tile has excellent wear properties, but is not as resilient as other types of floor covering; the inclusion of hollow particles in asphalt floor tile tends to increase its resiliency.

It will be understood that various changes and modifications may be made in the invention, and that the scope thereof is not to be limited except as set forth in the claims.

In the specification and claims all parts and percentages are by weight, unless otherwise indicated.

This application is a continuation-in-part of copending application Serial No. 213,487, filed March 1, 1951 (now abandoned), and contains subject matter common to and transferred from copending application Serial No. 383,909, filed October 2, 1953 (now abandoned).

We claim:

1. A process of forming hollow particles from film-forming material, which includes subdividing into droplets a solution comprising a volatile solvent having dissolved therein film-forming material and a material other than the volatile solvent which furnishes a gas that remains gaseous at normal temperatures, and heating the droplets to a temperature causing volatilization of the solvent in order to form a self-supporting, relatively gas-impervious particle wall coincident with particle formation and conversion of said gas-furnishing material into a gas that remains gaseous at normal temperatures, the amount of said gas furnished within said forming particle and which is trapped by the particle wall within the space thereof being sufficient to prevent collapse of the particle walls under the pressure of the surrounding atmosphere in order to form particles having a continuous hole-free wall.

2. A process in accordance with claim 1 in which the film-forming material is polyvinyl alcohol.

3. A process in accordance with claim 1 in which the film-forming material is a phenol-formaldehyde resin.

4. A process in accordance with claim 1 in which the film-forming material is a thermosetting resin in the thermoplastic stage of partial polymerization.

5. A process in accordance with claim 1 in which the gas-furnishing material is a gas dissolved in the solution.

6. A process in accordance with claim 1 in which the gas-furnishing material is a substance decomposable upon heating to liberate a gas.

7. A process in accordance with claim 6 in which the decomposable substance is dinitrosopentamethylene tetramine.

8. A process in accordance with claim 6 in which the decomposable substance is ammonium nitrite.

9. A process in accordance with claim 6 in which the decomposable substance is ammonium carbonate.

10. A process in accordance with claim 6 in which the decomposable substance is ammonium bicarbonate.

11. A mass of discrete, hollow, spherical particles, about 95% of which remain floating on petroleum naphtha after 24 hours, having individually separate, continuous, hole-free, self-supporting walls and having a gas sealed therewithin, said particles having a particle size range up to about 100 microns.

12. A mass of discrete, hollow, spherical particles, about 95% of which remain floating on petroleum naphtha after 24 hours, having individually separate, continuous, hole-free, self-supporting walls and having a gas sealed therewithin, the particles in said mass having an average diameter of from about 1 to about 500 microns.

13. A mass of the hollow particles of claim 12 having a bulk density of 0.01 to 0.3 and a liquid displacement density of 0.05 to 0.6.

14. A mass of the hollow particles of claim 12 in which the self-supporting walls are a synthetic plastic.

15. A mass of the hollow particles of claim 14 in which the bulk density is 0.1 to 0.2 and the liquid displacement density is 0.1 to 0.5.

16. A mass of the hollow particles of claim 15 in which the synthetic plastic is a phenol-formaldehyde condensate.

17. A mass of the hollow particles of claim 15 in which the synthetic plastic is a urea-formaldehyde condensate.

18. A mass of the hollow particles of claim 12 in which the self-supporting walls are an inorganic material.

19. A mass of the hollow particles of claim 18 in which the inorganic material is a sodium silicate.

20. A shaped mass comprising the hollow particles of claim 12 whose surfaces are bound together.

21. A shaped mass in accordance with claim 20 in which the particles are bound together by a cementitious material.

22. A shaped mass in accordance with claim 21 in which the cementitious material is rigid.

23. A shaped mass in accordance with claim 21 in which the cementitious material is non-rigid.

24. A shaped mass comprising the hollow particles in accordance with claim 15 whose surfaces are bound together by adherence directly one to another.

25. A shaped mass comprising hollow particles in accordance with claim 15 dispersed as a discontinuous phase in the binder as a continuous phase.

26. A shaped mass in accordance with claim 25 in which the binder is concrete.

27. A shaped mass in accordance with claim 25 in which the binder is gypsum plaster.

28. A shaped mass in accordance with claim 25 in which the binder is a synthetic resin.

References Cited in the file of this patent

UNITED STATES PATENTS

| | | |
|---|---|---|
| 1,673,685 | Johnston et al. | June 12, 1928 |
| 1,977,325 | Pfannkuch | Oct. 16, 1934 |
| 2,576,977 | Stober | Dec. 4, 1951 |